United States Patent

Salomon et al.

[11] Patent Number: 5,229,335
[45] Date of Patent: Jul. 20, 1993

[54] CERAMIC MATERIALS AND THEIR SYNTHESIS BY A XEROGEL PROCESS

[75] Inventors: Robert E. Salomon; Jorge J. Macho, both of Philadelphia, Pa.

[73] Assignee: Temple University - of the Commonwealth System of Higher Education, Philadelphia, Pa.

[21] Appl. No.: 786,452

[22] Filed: Nov. 1, 1991

[51] Int. Cl.$^5$ .............................................. C04B 35/00
[52] U.S. Cl. ........................................ 501/1; 501/12; 501/152; 505/735; 505/737; 505/780; 252/315.01
[58] Field of Search .................. 501/12, 152; 505/735, 505/737, 780, 1; 252/315.01

[56] References Cited

U.S. PATENT DOCUMENTS 4,829,031  5/1989  Roy et al. ............................. 501/134
5,066,636  11/1991  Liu et al. ........................ 505/737 X

OTHER PUBLICATIONS

Umeda et al., "Superconducting Fibers by the Sol-Gel Method", Adv. Cerm. Mat., vol. 3, No. 5 (1988) pp. 520–522.

Primary Examiner—Karl Group
Attorney, Agent, or Firm—Seidel, Gonda, Lavorgna & Monaco

[57] ABSTRACT

The invention provides a process for producing high phase purity ceramic materials through the utilization of organic gelling agents. The process comprises the following steps: (a) dissolving stoichiometric amounts of metal salts in a solvent to form a solution; (b) heating the solution to a temperature sufficient to dissolve the gelling agent; (c) dissolving from about 0.1 to about 50 weight percent of an organic gelling agent into the heated solution; (d) cooling the solution to form a gel; (e) drying the gel to form a xerogel precursor; and (f) subjecting the xerogel precursor to a calcination process to produce a high phase purity ceramic material.

34 Claims, 9 Drawing Sheets

$YBa_2Cu_3O_{7-x}$ RESISTIVITY MEASUREMENT

CERAMIC MATERIALS AND THEIR SYNTHESIS BY A XEROGEL PROCESS

FIELD OF THE INVENTION

This invention pertains to processes for the production of high phase purity ceramic materials through the utilization of organic gelling agents.

BACKGROUND OF THE INVENTION

The prior art is replete with references pertaining to the "sol-gel" technology for the production of ceramic particles such as powders. Generally, a "sol-gel" process is one which converts a colloidal dispersion, sol, aquasol or hydrosol of a metal oxide (or precursor thereof) to a "gel". A gel is a material formed wherein one or more of the components are cross-linked either chemically or physically to such an extent as to cause a three-dimensional network to form. The formation of this network results in an increase in viscosity of the mixture and a mechanical immobilization of the liquid phase within the network. The gelling step is often followed by a drying process. Thereafter, the dried composition or xerogel is then fired to obtain a ceramic material.

In the sol-gel method for producing ceramic particles, a xerogel is often obtained. The xerogel resulting from a sol-gel process is obtained from concentrating a colloidal dispersion (i.e., a sol) to form a gel by means of solvent extraction and then drying this gel.

In conventional sol-gel processes, it is very difficult to control the quality of the final product since product quality depends largely upon process conditions (e.g., pH, concentrations, solvent extraction rates and methods, colloidal particle size, and the like). Accordingly, due to the continually increasing demand for ceramic particles having a high level of purity, the industry would greatly welcome an improved process for preparing such materials, wherein the improved process has a lower degree of process control, and a higher degree of product reproduceability and quality.

SUMMARY OF THE INVENTION

One object of this invention pertains to a novel, improved process for producing high phase purity ceramic materials through the utilization of organic gelling agents.

Another object of the present invention pertains to a process for producing xerogel precursors which are highly stable with respect to atmospheric water, gases and vapors.

The aforementioned objects are achieved by the advent of a new process for producing high phase purity ceramic materials. The novel process of the present invention, comprises the following steps: (a) dissolving stoichiometric amounts of metal salts in a solvent to form a solution; (b) heating the solution to a temperature sufficient to dissolve the gelling agent, said temperature ranging from just below the boiling point of the solvent being employed to a temperature above about 50% below the solvent's boiling point, and said temperature being at least about 30° C. at STP conditions (or the equivalent temperatures at other pressures); (c) dissolving an organic gelling agent into the heated solution, wherein the amount of gelling agent being dissolved ranges from between about 0.1 to about 50 weight percent; (d) cooling the heated solution until a gel is formed; (e) drying the gel to form a xerogel precursor; and (f) subjecting the xerogel precursor to a calcination process to produce a ceramic material, wherein the temperature of the calcination process ranges from between about that which is necessary to result in the complete decomposition of the gelling agent to a temperature just below the melting point of the ceramic material.

Other objects, aspects and advantages of the present invention will become apparent to those skilled in the art upon reading the following detailed description when considered in connection with the accompanying drawings and appended claims.

BRIEF DESCRIPTION OF THE DRAWINGS

A more complete appreciation of the invention and many attendant advantages thereof will be readily obtained as the same becomes better understood by reference to the following detailed description when considered in connection with the accompanying figures briefly described below.

DETAILED DESCRIPTION OF THE INVENTION

This invention pertains to processes for the production of high phase purity ceramic particles through the utilization of organic gelling agents. The novel process of the present invention comprises the following steps.

First, a solution is prepared by dissolving, in an appropriate solvent, metal salts which cations are components of the desired ceramic material. The concentration of the metal salts in the solution must be high enough to obtain a satisfactory product yield, but low enough to achieve the desired final particle size. On the other hand, the solvent must be able to dissolve the metal salts being employed.

The preferred solvent will depend largely on the specific metal salts. Some examples of solutions which, depending on the salts, can be used as solvents include, but are not limited to: water, ethanol, methanol and other such alcohols; tetrahydrofurane, benzene and other such polar and non-polar solvents; mineral and organic acids; liquified gases; supercritical fluids, and the like.

After the solution is prepared, it is heated to a temperature which is sufficient to dissolve the gelling agent(s) being employed. This temperature generally ranges from about 50% below the solvent's boiling point to a temperature just below the solvent's boiling point in degrees centigrade. Preferably, the solution is heated to a temperature ranging from between about 40% below the boiling point of the solvent being employed to about 5% below the solvent's boiling point, and more preferably, from between about 30% below the solvent's boiling point to about 10% below the solvent's boiling point. Regardless of the solvent's boiling point, the solution must be heated to a temperature of at least about 30° C. at STP conditions (or the equivalent temperatures at other pressures).

Since there are many different solvents which can be employed when practicing the present invention, the preferred temperature at which to heat the solution will vary. For example, if water is selected as a suitable solvent, the solution containing the stoichiometric amounts of metal salts is preferably heated to a temperature ranging from between about 50° C. to a temperature just below about 100° C. Preferably, this particular solution should be heated to a temperature ranging from between about 60° C. to about 95° C., and more preferably, from between about 70° C. to about 90° C.

After the solution is heated to the appropriate temperature range, at least one organic gelling agent is dissolved therein. The amount of the organic gelling agent employed generally ranges from between about 0.1 to about 50 weight percent, depending, in part, upon the specific characteristics desired of the resulting ceramic material. Preferably, the amount of the gelling agent being employed ranges from between about 0.5 to about 20 weight percent, more preferably, from between about 1.0 to about 10 weight percent.

In addition to the above, it should be noted that more than one gelling agent can be employed during this specific process step. Moreover, the gelling agent(s) can be added to the solution prior to having the solution heated. In other words, the gelling agent(s) addition step and the solution heating step can be interchanged.

When determining the appropriate gelling agent, there are many factors which should be taken into consideration. Some of these factors are as follows: (a) the pH of the solution, (b) the ash residue of the gelling agent(s) after being calcined, (c) the possible interference between the gelling agent(s) ash residue and the final ceramic oxide product, and (d) the possible chemical reactions between the gelling agent(s) and the ions in solution.

After taking the above into consideration any suitable organic gelling agent(s) which falls within the desired parameters can be employed. Examples of suitable organic gelling agents include, but are not limited to: alginic acid and its salts, carrageenan, guar gum, agar, gelatin, pectin, xanthan gum, tamarind gum, arabic gum, carboxymethylcellulose salts, and the like, and/or mixtures thereof.

After the appropriate organic gelling agent(s) is dissolved, the solution is cooled until a gel is formed. Preferably, a gel should be formed by the time the solution is cooled to a temperature of about 25° C. It is possible, however, to practice this invention if a gel forms at temperatures above or below 25° C.

The resulting gel is then dried to form a dry gel or xerogel precursor. Any suitable drying method can be employed when practicing this invention. Examples of such suitable methods include, but are not limited to, vacuum drying, heat drying, and the like, and/or any combination thereof.

The resulting dry gel or xerogel precursor is then subjected to a calcination process. It should be noted that this calcination step must be performed under controlled atmospheric and temperature conditions to avoid unwanted chemical by-products or the formation of undesired crystalline phases in the final product.

The specific atmospheric temperature conditions depend largely upon the resulting final ceramic product. For example, one specific requirement of the calcination process is that it should not result in melting the dry gel or xerogel precursor, since this would lead to an undesired phase separation.

The minimum calcination temperature is that which is necessary to result in the complete decomposition of the gelling agent being employed. This information is readily available in the relevant literature. In many instances, the minimum calcination temperature is at least about 650° C.

When practicing this invention, it is sometimes preferable to grind the dry gel or xerogel precursor prior to the precursor being subjected to the calcination process. If this grinding step is performed, the particle size distribution would generally range from between about $-10$ mesh to about $-400$ mesh, preferably from between about $-50$ mesh to about $-300$ mesh, and more preferably, from between about $-100$ mesh to about $-200$ mesh. As stated above, this grinding procedure is not necessary in order to practice the present invention.

Figure 1:
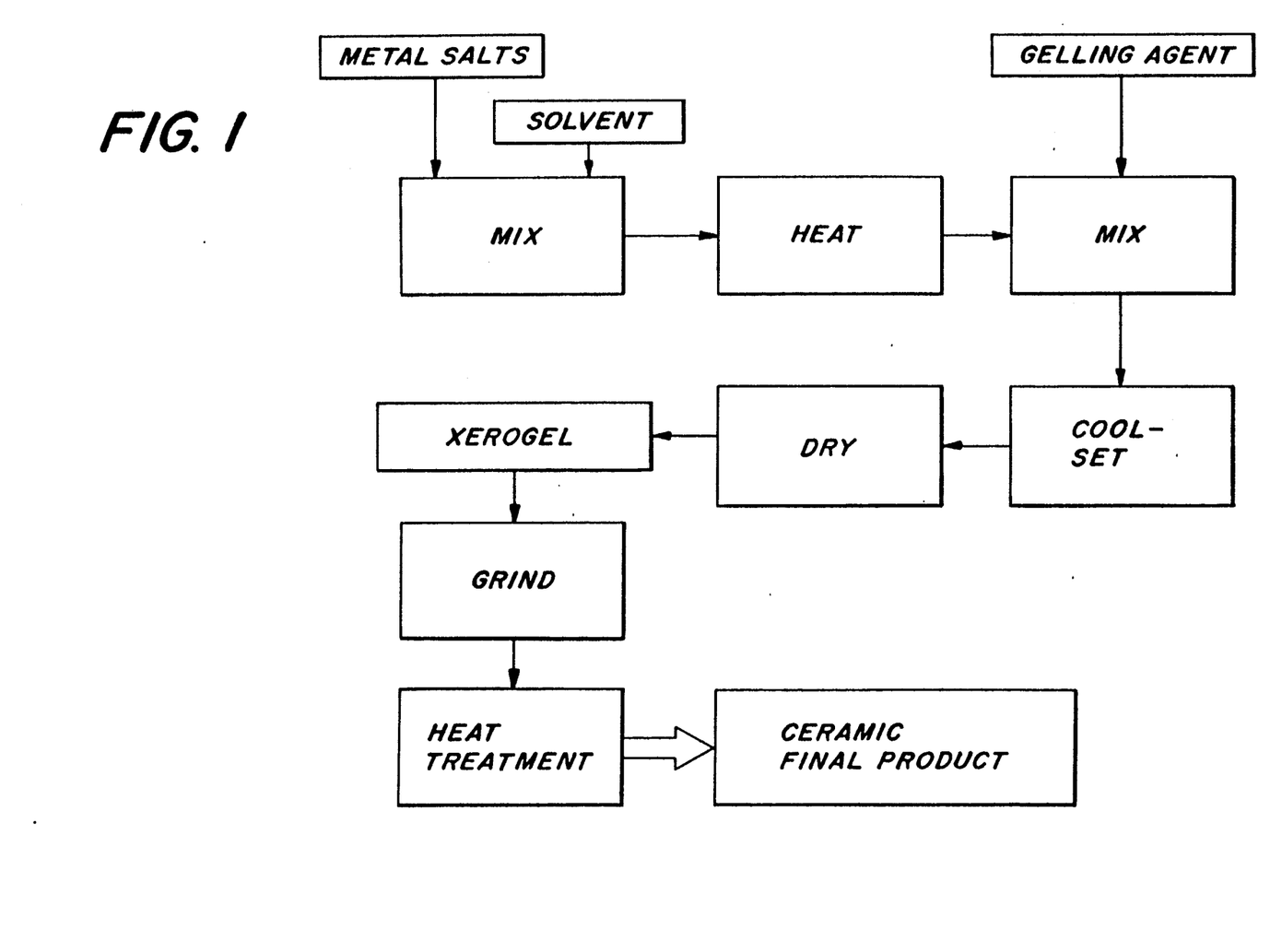
FIG. 1 is a flow diagram illustrating one embodiment of the process encompassed by the present invention.

There are many ways of practicing the present invention. FIG. 1, for example, is a flow diagram illustrating but one of the embodiments encompassed by the invention. As can be seen in FIG. 1, the xerogel precursor is ground prior to being calcined.

After the dry gel or xerogel precursor has been calcined, a high phase purity ceramic material is formed. This material can then be ground into its desired particle size. In most instances, the particle size distribution will range from between about 0.05 micron to about 2 mm, more preferably from about 0.1 micron to about 1 mm, and more preferably from between about 0.5 micron to about 0.5 mm.

The ceramic material resulting from practicing the present invention can be further subjected to a gaseous annealing process. The preferred method of gaseous annealing will depend, in part, upon the specific ceramic product and the desired results. This optional process is especially useful in the preparation of some high phase purity ceramic oxide superconductive particles, wherein the annealing is performed under oxygen gas flow.

One of the many utilities of the present invention resides in the ease, cleanliness and rapid method of producing high phase purity ceramic materials when compared to conventional methods of production. Moreover, the dry gel or xerogel precursors produced when practicing the process of the present invention, are very stable under a wide range of atmospheric conditions (e.g., relatively high humidity). For example, when compared to conventional precursors used in current technologies for producing ceramic oxide powders, the shelf life of the dry gel or xerogel precursors produced by the process of the present invention are far superior.

The following examples illustrate embodiments of carrying out some of the aspects of the present invention. However, these examples are not to be construed as limiting the invention to the embodiments to which they relate, or to the specific conditions involved therein.

EXAMPLE I

In this example, $YBa_2Cu_3O_7$, a well-known ceramic oxide superconductor, has been made by the process of the present invention. This resulting ceramic material has a crystalline phase purity comparable to that of a single crystal of the same superconducting material, and a particle size of less than one micron.

In producing this ceramic oxide superconductor in accordance with the present invention, stoichiometric amounts of yttrium, barium and copper acetates were dissolved in hot water. After the resulting solution had its temperature stabilized to within the range of between 75° C. to 90° C., approximately 2 weight percent of gelatin was added as the gelling agent and dissolved therein. The weight percent of gelatin added to the solution was based on the total weight of the solution prior to its addition.

This heated solution was then cooled until a gel was formed. The gel was then vacuum dried under less than 30 Torr pressure to form a xerogel precursor.

The resulting xerogel precursor was ground with a mortar and pessel to form particles having a size distribution ranging from between about −100 mesh to about −200 mesh. A 100 gram sample of the dried, ground precursor was then placed into a small alumina crucible. Thereafter, this sample was calcined by being subjected to the following heat treatment process.

First, while the sample was at room temperature, it was placed into a box furnace also at room temperature. Then, the temperature of the furnace was ramped up to 200° C. at a rate of 5° C. per minute. Once at 200° C,. the sample was maintained at this temperature for 4 hours.

Then, the furnace temperature was ramped to 600° C. at a rate of 5° C. per minute. After this temperature was reached, the sample was held at this temperature for 8 hours.

Finally, the furnace temperature was again ramped to 920° C. at a rate of 5° C. per minute. The sample was maintained at this temperature for 12 hours. After the 12 hour heat treatment period, the calcination process was completed. The entire calcination process was performed under an air atmosphere.

After the calcination process was completed, the sample was cooled to room temperature at a rate of about 5° C. per minute. The resulting ceramic product was in the form of a black spongy mass. This mass was reground with a mortar and pessel to form a ceramic powder material having a particle size distribution ranging from between 1 to 5 microns.

The ceramic powder was then subjected to an oxygen annealing process. Here, the powder was placed in a tube furnace and heated from room temperature to 550° C. at a rate of 5° C. per minute while under an oxygen atmosphere.

Once the powder reached 550° C., it was maintained at this temperature for 5 hours. Thereafter, it was cooled to room temperature at a rate of 5° C. per minute.

Figure 2:
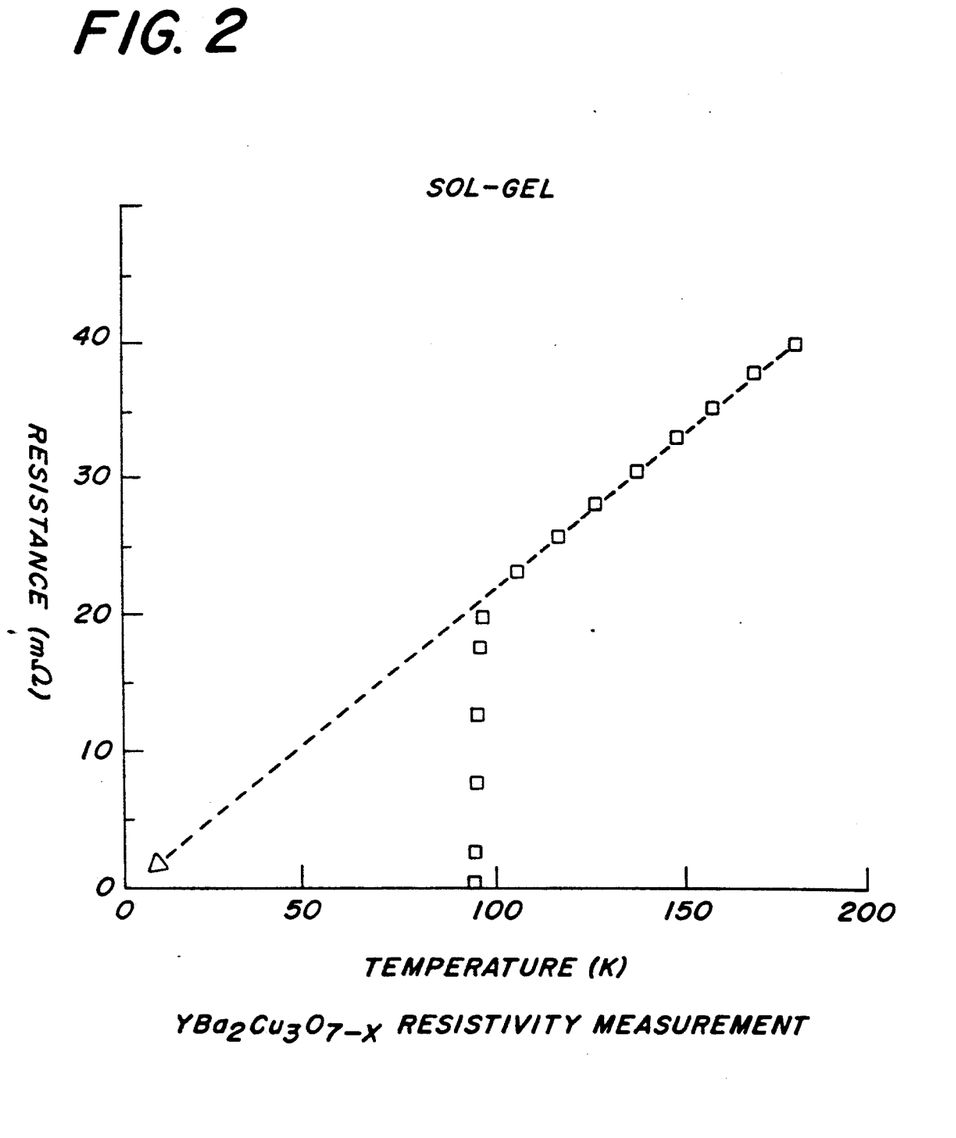
FIG. 2 is a resistivity measurement of a ceramic oxide material ($YBa_2Cu_3O_{7-x}$).
Figure 3:
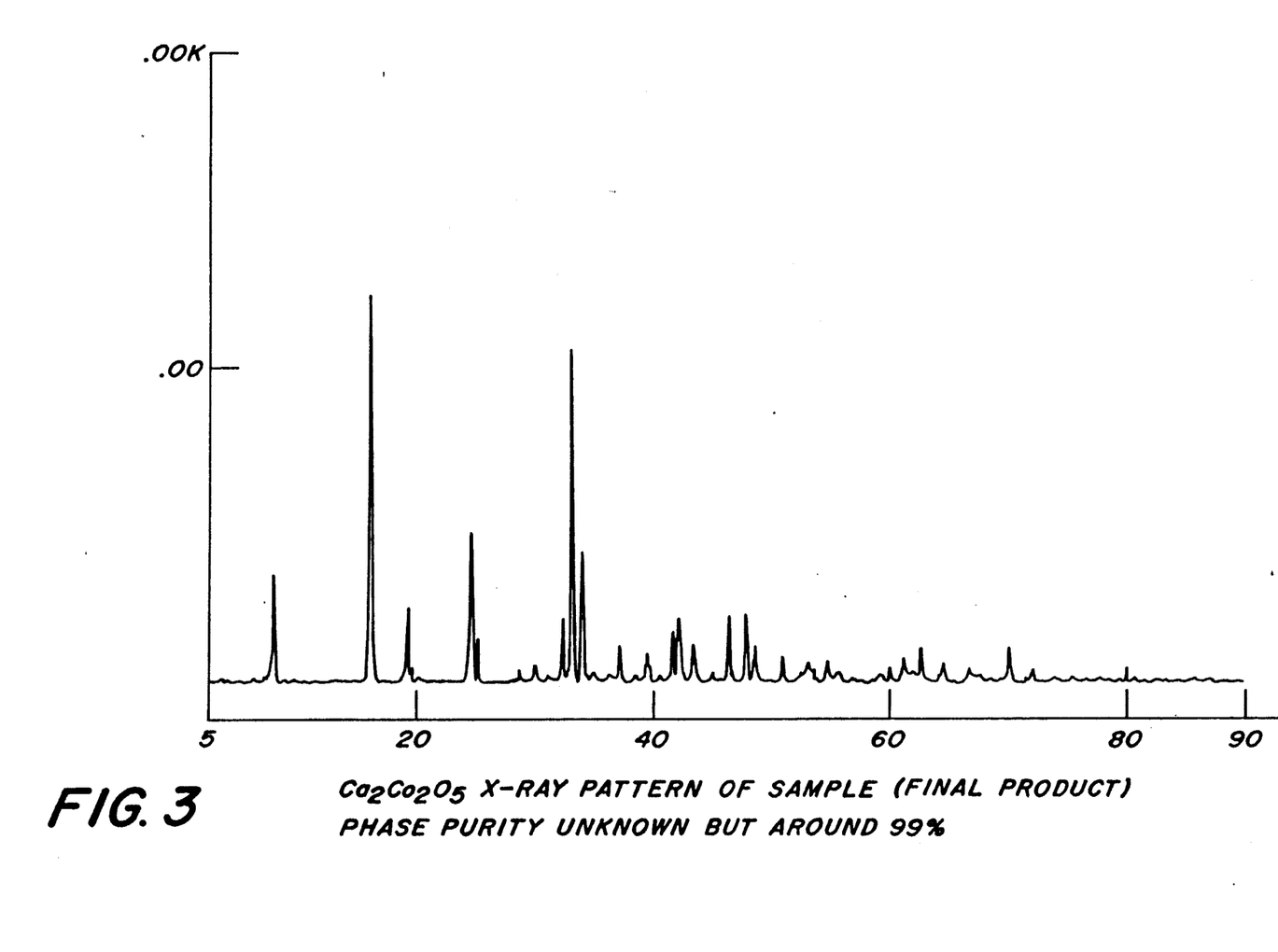
FIG. 3 is an x-ray diffraction pattern of a ceramic oxide material ($Ca_2Co_2O_5$) having a purity of around 99%.

The resulting material was a ceramic oxide powder. This powder was then tested for purity. The results of the tests performed thereon are illustrated in FIGS. 2 and 5.

Figure 5:
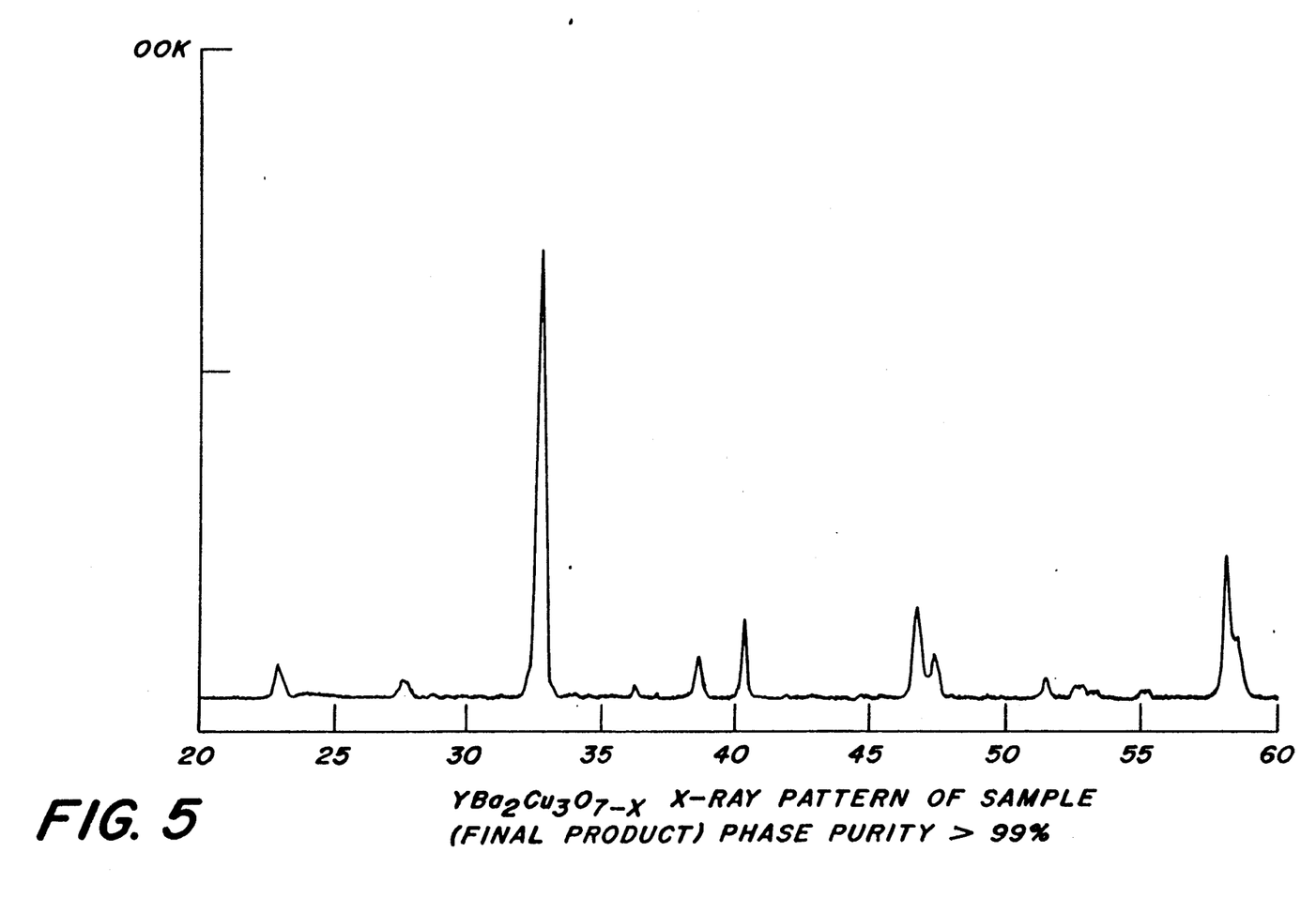
FIG. 5 is an x-ray diffraction pattern of a ceramic oxide material ($YBa_2Cu_3O_{7-x}$) having purity of greater than 99%.
Figure 7:
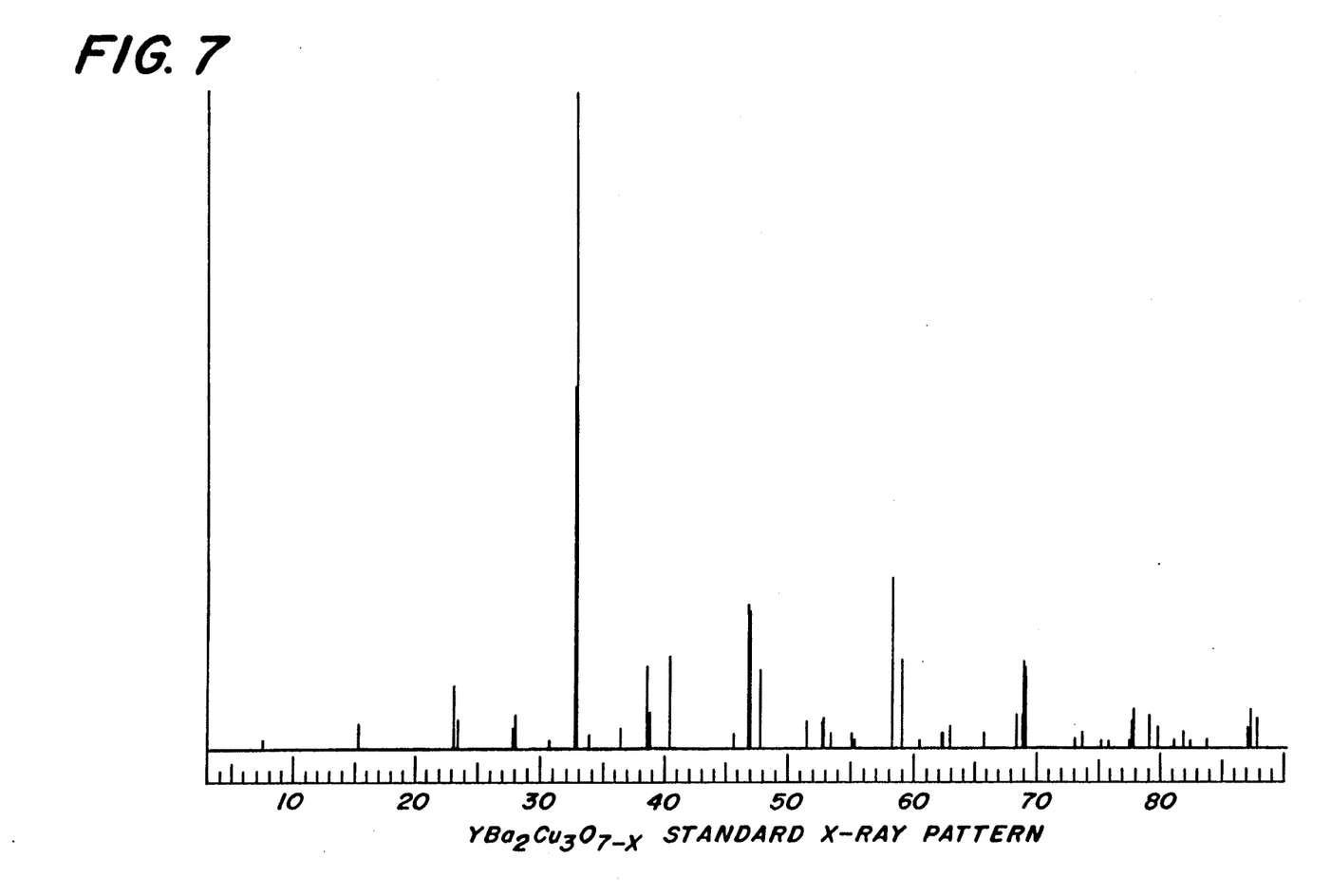
FIG. 7 is a standard x-ray diffraction pattern of a ceramic oxide material ($YBa_2Cu_3O_{7-x}$)

FIG. 5 is the X-ray diffraction pattern of the final product and shows a crystalline phase purity of around 99% (orthorhombic phase $YBa_2Cu_3O_7$) as calculated using Chung's method based on the standard XRD pattern shown in FIG. 7 (from JCPDS-International Center for Diffraction Data). In FIG. 2 (resistivity measurement), we can see that the critical temperature is 91K (characteristic of this superconductor material) with a sharp transition of ±2 K.

The linearity of the resistivity versus temperature and the apparent lack of a substantial impurity component of the resistivity are noteworthy features. As can be seen, a linear extrapolation of the resistivity versus temperature has a near zero (negative) intercept at the resistance axis. This kind of behavior is only seen in high quality epitaxial thin film and single crystals of this material and is extremely rare in powdered samples. The critical temperature (91K) was corroborated by magnetic susceptibility measurements.

This ceramic superconductive material was then subjected to a battery of tests: Thermal Gravimetric Analysis (TGA) of the xerogel precursors was performed using a Perkin-Elmer DSC-2C/TGS-2 TABS System. To a large extent, the specific heat treatment of the precursors to obtain the final product was based on the results of this TGA Analysis.

The stoichiometry of the metals in the xerogel and final product were analyzed by atomic absorption-emission spectroscopy. The samples were prepared by dissolving 0.2 grams of materials in 25 ml of concentrated HCL and diluted to one liter with deionized water. Two grams of potassium chloride were then added to the solution to avoid ionization of yttrium and barium. The analysis was done on a Perkin-Elmer 3030 AA/AE Spectrometer using standards from Fischer Scientific Company. Copper and yttrium were determined in the absorption mode and barium in the emission mode.

X-Ray Diffraction patterns were obtained using a Rigaku D/max-B X-ray diffractometer. The data was compared by the Rigaku computer system with a CD-ROM Powder Diffraction File compiled by JCPDS—Iternational Center for Diffraction Data.

Magnetic Susceptibility data for a temperature range of 10 to 400K, in a magnetic field lower than 0.5 tesla, was measured using a Quantum Design SQUID magnetometer.

Resistivity data was obtained using the four (4) point probe method, with the current to the sample and temperature controlled by a computer.

Particle size of the final ceramic powders was determined by Scanning Electron Microscopy (SEM)—Phillips SEM 500.

EXAMPLE II $YBa_2Cu_4O_8$ (also known as 124) another well-known ceramic oxide superconductor was made by a process encompassed by the present invention, at the low pressure of 1 ATM of oxygen (compared with 400 ATM of oxygen used by other methods). This low atmospheric pressure for the process is an inherent advantage of this method. The crystalline phase purity of this ceramic is also close to 99%, with a critical temperature of 80K (as expected for this material) and a particle size smaller than one micron.

To produce this ceramic powder by means of this invention, an aqueous solution of stoichiometric amounts of yttrium, barium and copper acetates was heated to within the range of between 75° C. to 90° C.

Approximately two weight percent of the gelling agent (gelatin in this case) was dissolved in the hot solution. The weight percent is based on the weight of the solution prior to the addition of the gelling agent.

The above solution was gelled when cooled to room temperature. The gel was then vacuum dried under less than 30 Torr of pressure to form a xerogel precursor. The resulting xerogel was the ground to a particle size distribution ranging from −100 to −200 mesh. A 100 gram sample of ground xerogel was then placed in a calcination boat. Thereafter, this sample was calcined by being subjected to the following heat treatment process.

First, while the sample was at room temperature, it was placed into a tube furnace also at room temperature. A flowing current of oxygen gas was then passed through the sample, maintaining a pressure of 1 ATM inside the tube. Then, the temperature of the furnace was ramped up tp 200° C. and the sample was maintained at this temperature for 4 hours.

Then, the sample was taken out of the furnace and reground to the same particle size distribution as before. The ground and relatively hot sample was replaced in the tube furnace at 200° C. and same atmospheric conditions (oxygen flow and one ATM pressure). Then, the temperature was ramped up to 800° C. at a rate of 10–15 degrees per minute. After 800° C. was reached the sample was held at that temperature for 20 hours.

Finally, the sample was taken out of the furnace and reground (while still hot) to a particle size similar to the two previous grinding steps. Once powdered, the sample was placed back into the tube furnace (at 800° C., flowing $O_2$ and 1 ATM of pressure) and held there for 42 hours. After this last 42 hours of heat treatment, the calcination process was completed; and, the sample was cooled down to room temperature at a rate of about 10 degrees per minute.

The resulting ceramic product was a black powdery material having a particle size distribution ranging from 0.5 to 2 microns. This powder was tested for purity and the results of the tests performed are illustrated in FIGS. 4, 8 and 9.

Figure 4:
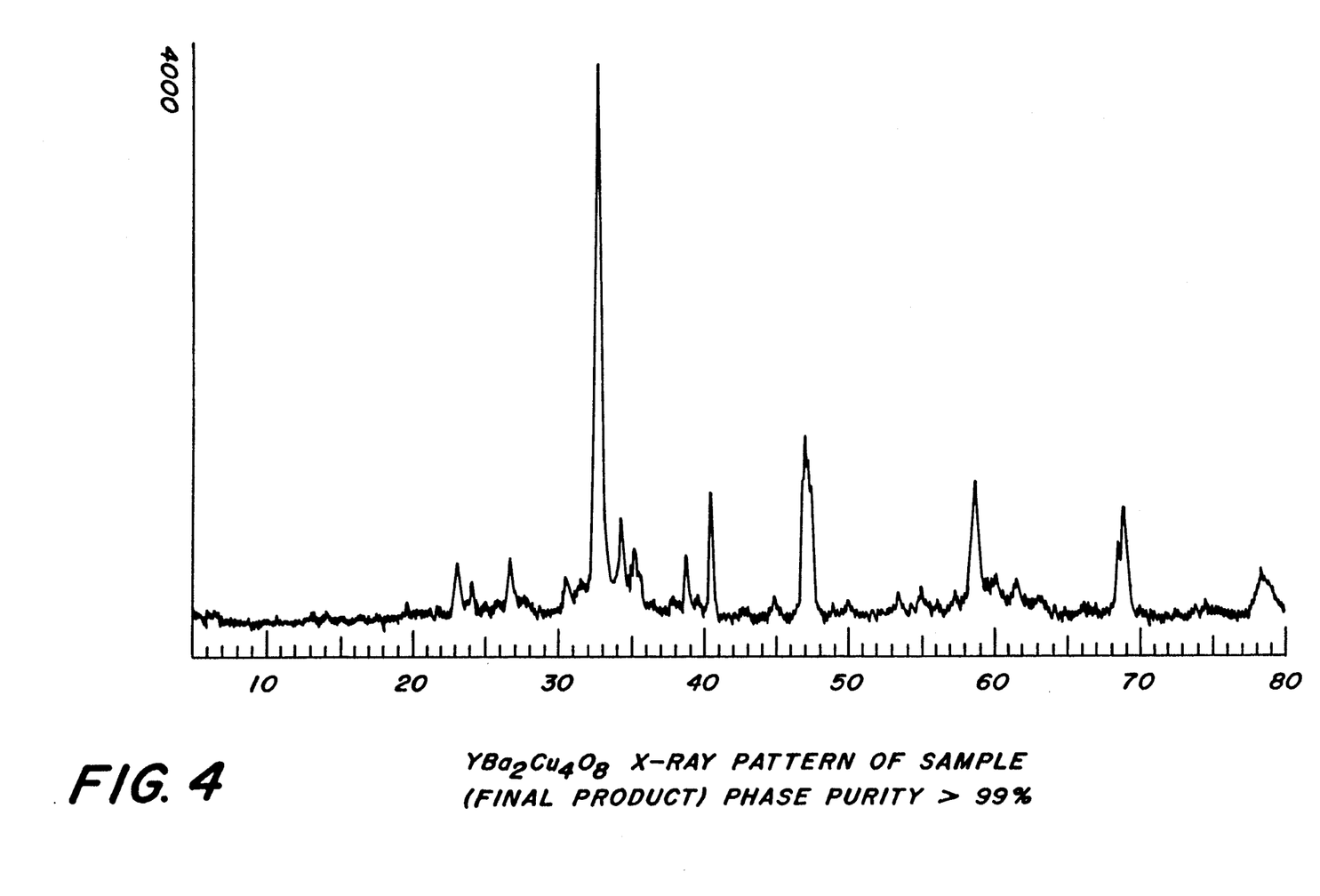
FIG. 4 is an x-ray diffraction pattern of a ceramic oxide material ($YBa_2Cu_3O_8$) having a purity of greater than 99%.
Figure 6:
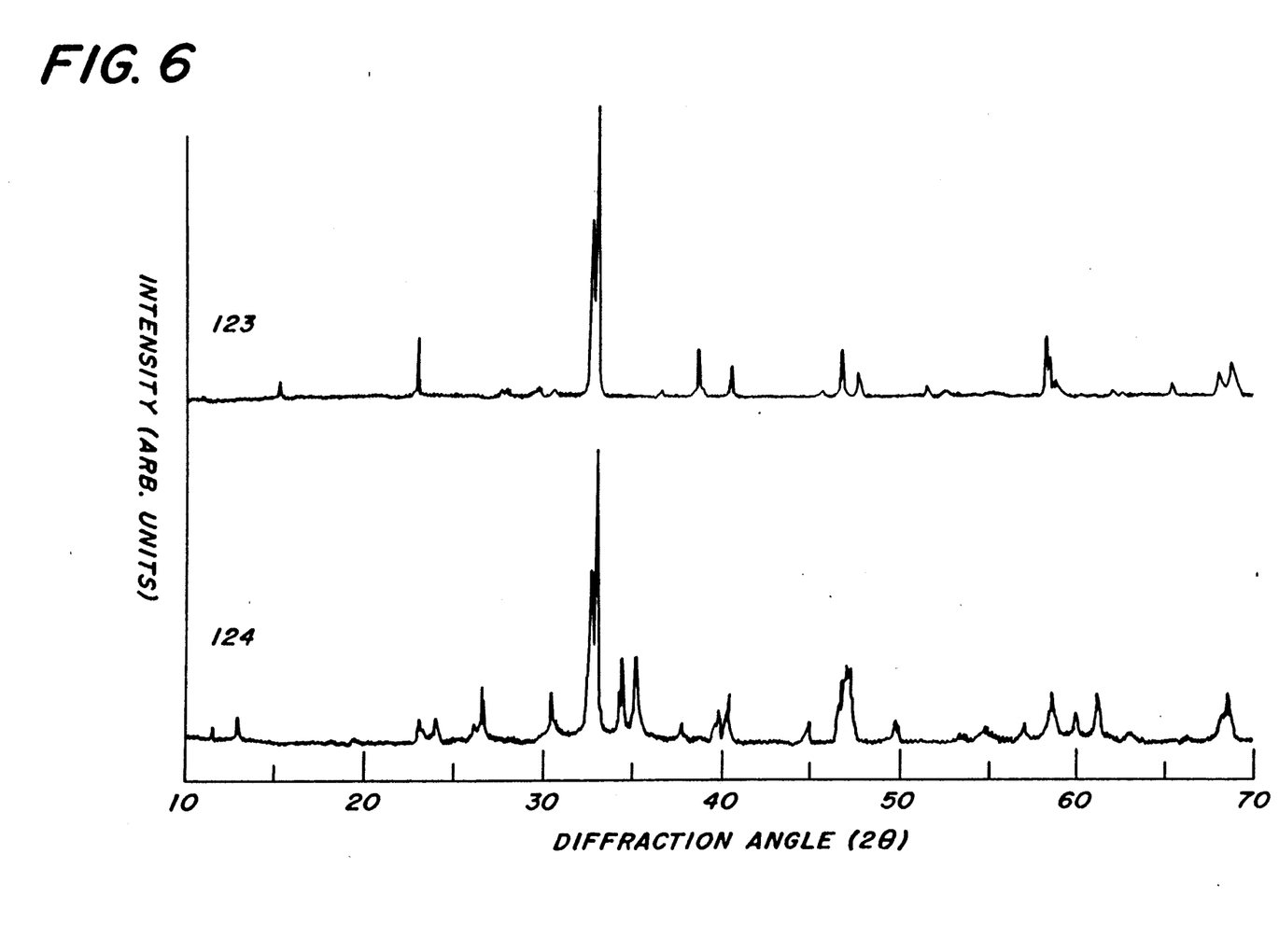
FIG. 6 is a standard x-ray diffraction pattern of a ceramic oxide material ($YBa_2Cu_4O_8$).

FIG. 4 is the X-ray diffraction pattern of the final product and shows a crystalline phase purity of around 99% ($YBa_2Cu_4O_8$) as calculated using Chung's method based in the standard XRD pattern shown in FIG. 6 (From JCPDS-International Centre for Diffraction Data).

Figure 8:
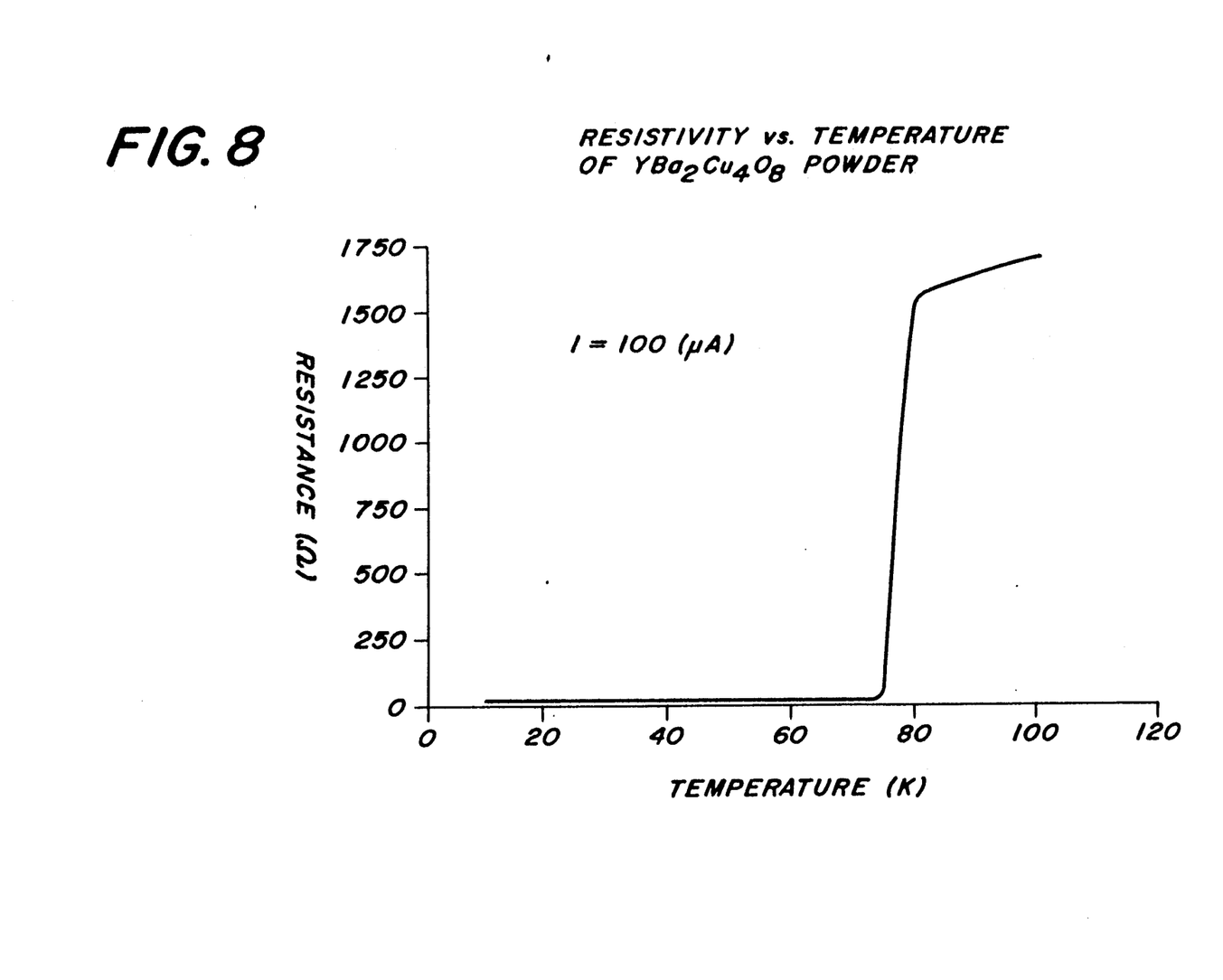
FIG. 8 is a graph illustrating resistivity versus temperature of the ceramic oxide superconductor $YBa_2Cu_4O_8$.

In FIG. 8, which is the result of the resistivity versus temperature measurement, it can be seen that the critical temperature is 80K (characteristic of this material) with a sharp transition of ±2K. This was confirmed by magnetic susceptibility measurements.

Figure 9:
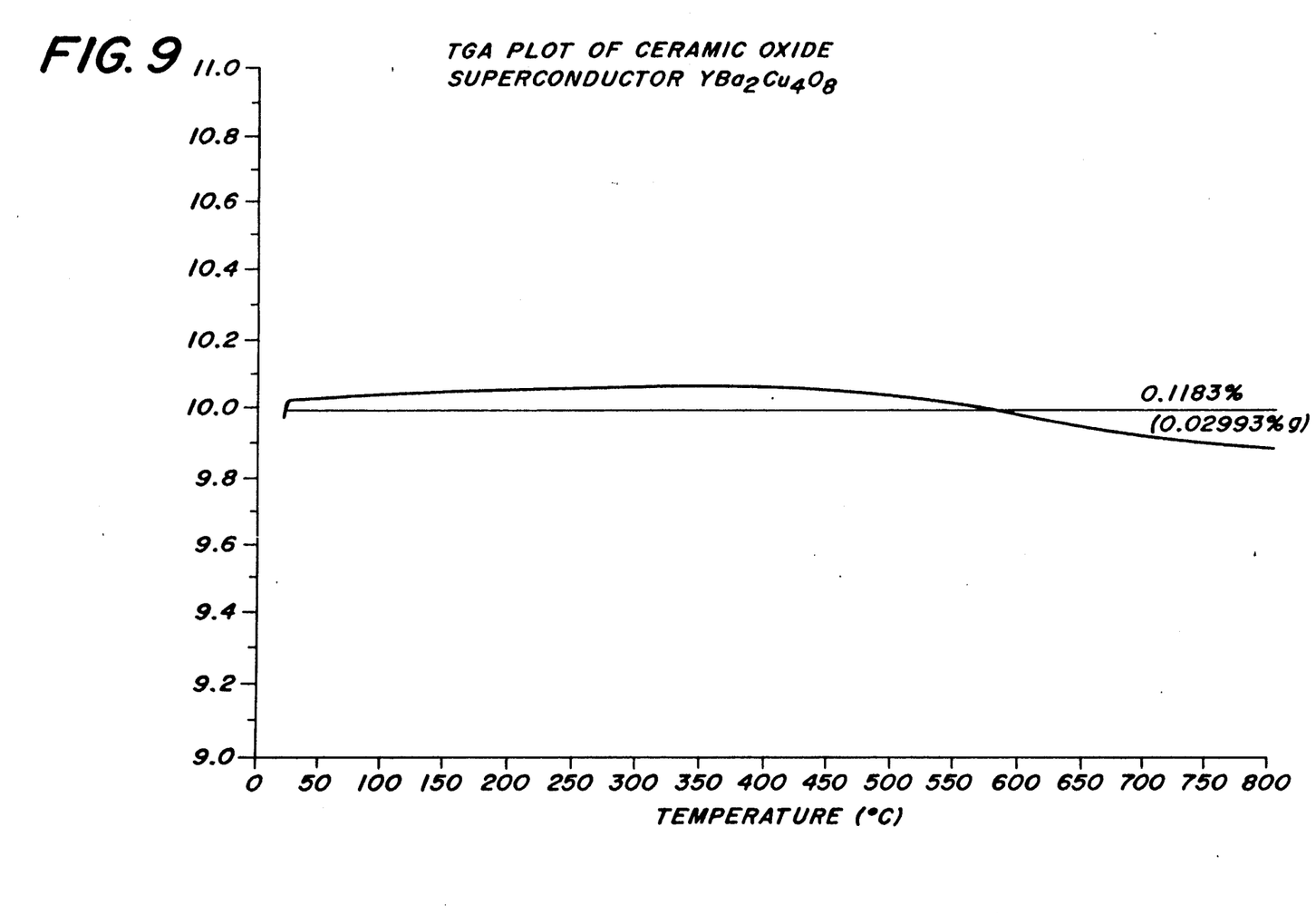
FIG. 9 is a Thermal Gravimetric Analysis illustrating the stability of a ceramic material $YBa_2Cu_4O_8$ when heated from room temperature to 800° C.

Finally, in FIG. 9 (Thermal Gravimetric Analysis or TGA) shows the stability of the final product when heated from room temperature to 800° C. This kind of stability (no weight losses) is characteristic of this material and any impurity phase will yield a change in weight, for example, a common impurity in this 124 superconductor is another superconductor oxide, $YBa_2Cu_3O_7$, which will decompose at 600° C. loosing oxygen to become $YBa_2Cu_3O_{6.5}$. Therefore, any amount of this impurity will yield a weight loss around 600° C. that will be easily detected in the TGA analysis.

Thermal Gravimetric Analysis (TGA), analysis of precursors and final products was performed using a Perkin-Elmer DSC-2C/TGS-2 TADS System. To a large extent the specific heat treatment of the precursors to obtain the final product was based on the results of this TGA analysis.

The stoichiometry of the metals in the xerogel and final product were analyzed by atomic absorption-emission spectroscopy. The samples were prepared by dissolving 0.2 of materials in 25 ml of conc. HCL and diluted to one liter with deionized water. Two grams of potassium chloride were then added to the solution to avoid ionization of yttrium and barium. The analysis was done on a Perkin-Elmer 3030 AA/AE Spectrometer using standards from Fischer Scientific Company. Cooper and yttrium were determined in the absorption mode and barium in the emission mode.

X-Ray Diffraction patterns were obtained using a Rigaku D/max-B X-ray diffractometer. The data was compared by the Rigaku computer system with a CD-ROM Powder Diffraction File compiled by JCPDS—International Centre for Diffraction Data.

Magnetic Susceptibility data for a temperature range of 10 to 400K, in a magnetic field lower than 0.5 tesla, was measured using a Quantum Design SQUID magnetometer.

Resistivity data was obtained using the four point probe method, with the current to the sample and temperature controlled by computer.

Particle size of the final ceramic powders was determined by Scanning Electron Microscopy (SEM)—Phillips SEM 500.

It is evident from the foregoing that various modifications can be made to the embodiments of this invention without departing from the spirit and/or scope thereof which would be apparent to those skilled in the art. Having thus described the invention, it is claimed as follows.

That which is claimed is:

1. A process for producing high phase purity ceramic materials through the utilization of organic gelling agents, said process comprises the following steps:
   (a) dissolving stoichiometric amounts of metal salts in a solvent to form a solution;
   (b) heating said solution to a temperature sufficient to dissolve the particular gelling agent being employed,
      (i) said temperature ranging from just below the boiling point of said solvent to a temperature above about 50% below said solvent's boiling point, in degrees centigrade, and
      (ii) said temperature being at least about 30° C. at STP conditions;
   (c) dissolving an organic gelling agent into the heated solution wherein the amount of said gelling agent being dissolved ranges from between about 0.1 to about 50 weight percent, said weight percent being based on the total weight percent of said heated solution prior to the addition of said gelling agent;
   (d) cooling the solution until a gel is formed;
   (e) drying the gel to form a xerogel precursor; and
   (f) subjecting the xerogel precursor to a calcination process to produce a ceramic material, wherein the temperature of the calcination process ranges from between about that which is necessary to result in the complete decomposition of the gelling agent to a temperature just below the melting point of said ceramic material.

2. A process for producing ceramic materials as recited in claim 1 wherein the solvent is selected from the groups consisting of: water, ethanol, methanol, tetrahydrofuran, benzene, mineral and organic acids, liquified gases, and supercritical fluids.

3. A process for producing ceramic materials as recited in claim 1 wherein the temperature at which said solution is heated in step (b) ranges from about 40% below the boiling point of said solvent, in degrees centigrade, to about 5% below the boiling point of said solvent, in degrees centigrade.

4. A process for producing ceramic materials as recited in claim 3 wherein the temperature at which said solution is heated in step (b) ranges from about 30% below the boiling point of said solvent, in degrees centigrade, to about 10% below the boiling point of said solvent, in degrees centigrade.

5. A process for producing ceramic materials as recited in claim 2 wherein said solvent is water.

6. A process for producing ceramic materials as recited in claim 5 wherein said solution is heated, in step (b), to a temperature ranging from between about 50° C. to a temperature just below about 100° C.

7. A process for producing ceramic materials as recited in claim 6 wherein said solution is heated, in step (b), to a temperature ranging from between about 60° C. to a temperature just below about 95° C.

8. A for producing ceramic materials as recite claim 7 said solution is heated, in step (b), to a temperature ranging from between about 70° C. to a temperature just below about 90° C.

9. A process for producing ceramic materials as recited in claim 1 wherein the amount of organic gelling agent employed in step (c) ranges from between about 0.5 to about 20 weight percent, said weight percent being based on the total weight percent of said heated solution prior to the addition of said gelling agent.

10. A process for producing ceramic materials as recited in claim 9 wherein the amount of organic gelling agent employed in step (c) ranges from between about 1.0 to about 10 weight percent, said weight percent being based on the total weight percent of said heated solution prior to the addition of said gelling agent.

11. A process for producing ceramic materials as recited in claim 1 wherein said gelling agent is selected from the group consisting of: alginic acid and its salts, carrageenan, guar gum, agar, gelatin, pectin, xanthan gum, tamarind gum, arabic gum, carboxymethylcellulose salts, and mixtures thereof.

12. A process for producing ceramic materials as recited in claim 1 wherein said organic gelling agent is added to said solution, prior to having said solution subjected to the heat treatment process set out in step (b).

13. A process for producing ceramic materials as recited in claim 1 wherein, between steps (e) and (f) said precursor is ground.

14. A process for producing ceramic materials as recited in claim 13 wherein, prior to subjecting said precursor to said calcination process, said precursor is ground into particles having a size distribution ranging from between about −10 mesh to about −400 mesh.

15. A process for producing ceramic materials as recited in claim 14 wherein, prior to subjecting said precursor to said calcination process, said precursor is ground into particles having a size distribution ranging from between about −50 mesh to about −300 mesh.

16. A process for producing ceramic materials as recited in claim 13 wherein, prior to subjecting said precursor to said calcination process, said precursor is ground into particles having a size distribution ranging from between about −100 mesh to about −200 mesh.

17. A process for producing ceramic materials as recited in claim 1 wherein, after step (f), said ceramic material is ground to form particles having a size distribution ranging from between 0.05 micron to about 2 mm.

18. A process for producing ceramic materials as recited in claim 17 wherein, after step (f), said ceramic material is ground to form particles having a size distribution ranging from between 0.1 micron to about 1 mm.

19. A process for producing ceramic materials as recited in claim 18 wherein, after step (f), said ceramic material is ground to form particles having a size distribution ranging from between 0.5 micron to about 0.5 mm.

20. A process for producing ceramic materials as recited in claim 1 wherein, after step (f), said ceramic material is subjected to a gaseous annealing process.

21. A process for producing ceramic materials as recited in claim 20 wherein a high phase purity ceramic oxide material is formed during said gaseous annealing step.

22. A process for producing high phase purity ceramic materials through the utilization of organic gelling agents, said process comprises the following steps:
(a) dissolving stoichiometric amounts of yttrium, barium and copper acetates in a solvent to form a solution;
(b) heating said solution to a temperature sufficient to dissolve the particular gelling agent being employed,
  (i) said temperature ranging from just below the boiling point of said solvent to a temperature above about 50% below said solvent's boiling point, in degrees centigrade, and
  (ii) said temperature being at least about 30° C. at STP conditions;
(c) dissolving an organic gelling agent into the heated solution wherein the amount of said gelling agent being dissolved ranges from between about 0.1 to about 50 weight percent, said weight percent being based on the total weight percent of said heated solution prior to the addition of said gelling agent;
(d) cooling the solution until a gel is formed;
(e) drying the gel to form a xerogel precursor; and
(f) subjecting the xerogel precursor to a calcination process to produce a ceramic material, wherein the temperature of the calcination process ranges from between about that which is necessary to result in the complete decomposition of the gelling agent to a temperature just below the melting point of said ceramic material.

23. A process for producing ceramic materials as recited in claim 22 wherein the solvent is selected from the group consisting of: water, ethanol, methanol, tetrahydrofuran, benzene, mineral acids, organic acids, liquified gases and supercritical fluids.

24. A process for producing ceramic materials as recited in claim 22 wherein the temperature at which said solution is heated in step (b) ranges from between about 40% below the boiling point of said solvent, in degrees centigrade, to about 5% below the boiling point of said solvent, in degrees centigrade.

25. A process for producing ceramic materials as recited in claim 22 wherein said solvent is water.

26. A process for producing ceramic materials as recited in claim 25 wherein said solution is heated, in step (b), to a temperature ranging from between about 50° C. to a temperature just below about 100° C.

27. A process for producing ceramic materials as recited in claim 22 wherein the amount of organic gelling agent employed in step (c) ranges from between about 0.5 to about 20 weight percent, said weight percent being based on the total weight percent of said heated solution prior to the addition of said gelling agent.

28. A process for producing ceramic materials as recited in claim 22 wherein said gelling agent is selected from the group consisting of: alginic acid and its salts, carrageenan, guar gum, agar, gelatin, pectin, xanthan gum, tamarind gum, arabic gum, carboxymethylcellulose salts, and mixtures thereof.

29. A process as recited in claim 28 wherein said gelling agent is gelatin.

30. A process as recited in claim 22 wherein said organic gelling agent is added to said solution, prior to having said solution subjected to the heat treatment process set out in step (b).

31. A process for producing ceramic materials as recited in claim 22 wherein, between steps (e) and (f), said precursor is ground.

32. A process for producing ceramic materials as recited in claim 31 wherein, prior to subjecting said precursor to said calcination process, said precursor is ground into particles having a size distribution ranging from between about −10 mesh to about −400 mesh.

33. A process for producing ceramic materials as recited in claim 22 wherein after step (f), said ceramic material is ground to form particles having a size distribution ranging from between about 0.05 micron to about 2 mm.

34. A process for producing ceramic materials as recited in claim 22 wherein, after step (f), said ceramic material is subjected to a gaseous annealing process.

* * * * *